United States Patent
Gherardi et al.

(10) Patent No.: US 6,957,724 B2
(45) Date of Patent: Oct. 25, 2005

(54) VEHICLE DISK BRAKE

(75) Inventors: Pierangelo Gherardi, Zogno (IT); Riccardo Arrigoni, Gorgonzola (IT)

(73) Assignee: Freni Brembo S.p.A. (IT)

( * ) Notice: Subject to any disclaimer, the term of this patent is extended or adjusted under 35 U.S.C. 154(b) by 0 days.

(21) Appl. No.: 10/257,743

(22) PCT Filed: Mar. 23, 2001

(86) PCT No.: PCT/EP01/03313
§ 371 (c)(1),
(2), (4) Date: Oct. 16, 2002

(87) PCT Pub. No.: WO01/79723
PCT Pub. Date: Oct. 25, 2001

(65) Prior Publication Data
US 2003/0136617 A1 Jul. 24, 2003

(30) Foreign Application Priority Data
Apr. 18, 2000 (EP) .............................. 00830294

(51) Int. Cl.⁷ .............................. F16D 65/40
(52) U.S. Cl. .................................. 188/73.38
(58) Field of Search ............................ 188/72.3, 73.31, 188/73.36, 73.37, 73.38, 73.44, 73.47

(56) References Cited

U.S. PATENT DOCUMENTS

| | | | | |
|---|---|---|---|---|
| 3,899,051 A | * | 8/1975 | Grosseau ................. | 188/73.38 |
| 3,986,164 A | * | 10/1976 | Hirai et al. .................. | 340/454 |
| 4,491,204 A | * | 1/1985 | Dirauf et al. ............. | 188/73.38 |
| 5,249,647 A | * | 10/1993 | Kobayashi et al. ........ | 188/72.3 |
| 5,687,817 A | | 11/1997 | Kobayashi et al. | |
| 5,947,234 A | | 9/1999 | Shimazaki | |

FOREIGN PATENT DOCUMENTS

| | | | | |
|---|---|---|---|---|
| DE | 2 225 178 | | 1/1974 | |
| GB | 1 364 861 | | 8/1974 | |
| JP | 56031531 A | * | 3/1981 | ......... F16D/55/224 |

\* cited by examiner

Primary Examiner—Xuan Lan Nguyen
(74) Attorney, Agent, or Firm—Frommer Lawrence & Haug, LLP; John R. Lane (57) ABSTRACT

A disk-brake unit which has an unusual ability to operate safely as well as a simple construction and which is intended to be fitted in vehicles, comprises a caliper body extending astride a braking disk, at least one pair of pads facing the disk on opposite sides and restrained on the caliper body by suspension on a pin, each pad having a support plate for a friction lining, and stop region formed in the plates and facing respective complementary stop section formed in the caliper body for restraining the pads in a direction tangential to the disk, the unit further comprising between the pin and the at least one pair of pads, a single element for constantly maintaining the suspension of the pads on the pin and simultaneously constantly urging each pad both towards the complementary stop section and away from the braking disk.

42 Claims, 10 Drawing Sheets

VEHICLE DISK BRAKE

This application is a 371 of PCT/EP01/03313 filed on Mar. 23, 2001.

BACKGROUND OF THE INVENTION

The subject of the present invention is a disk brake unit.

In particular, the present invention relates to a disk brake unit comprising a caliper body extending astride a braking disk, at least one pair of pads facing the disk on opposite sides and restrained on the caliper body by suspension on a pin, each pad having a support plate for a friction lining, as well as stop means formed in the plates and facing respective complementary stop means formed in the caliper body for restraining the pads in a direction tangential to the disk.

As is known, in disk brake units of the type indicated above, the need arises to limit as far as possible the braking noise which often takes the form of a particularly annoying whistle.

This phenomenon is attributed to vibration of the pads arising during braking.

A method of the prior art for preventing this problem proposes that the disk brake unit of the type specified above comprise, in addition to a spring acting between the caliper body and the pads in order to move them away from the braking disk, a spring mounted on each plate, and acting between the caliper body and the plate, in order constantly to urge the stop means provided in the plates towards the complementary stop means provided in the caliper body.

However, it should be borne in mind that this spring makes the construction of the disk brake unit particularly complex.

In fact, it is essential to provide suitable seats in the plates for housing the springs, as well as means for fixing the springs.

Moreover, because of the provision of the spring as proposed in the prior art, the assembly of the disk brake unit, as well as operations to replace the pads or the disk, or the disk and wheel assembly in motorcycling applications, are particularly laborious.

In fact, it must be borne in mind that the above-mentioned spring necessitates predefined assembly and dismantling operations which are poorly suited to maintenance situations.

The provision of these springs complicates operations to fit the disk brake unit or to replace the pads to an extent such as to prevent their use in disk brake units intended for racing vehicles.

SUMMARY OF THE INVENTION

The problem upon which the present invention is based is that of proposing a disk brake unit which has structural and functional characteristics such as to overcome the disadvantages mentioned above with reference to the prior art.

This problem is solved by means of a disk brake unit of the type specified above, characterized in that it comprises, between the pin and the at least one pair of pads, a single element for constantly maintaining the suspension on the pin and simultaneously constantly urging each pad both towards the complementary stop means and away from the braking disk.

BRIEF DESCRIPTION OF THE SEVERAL VIEWS OF THE DRAWINGS

Further characteristics and the advantages of the disk brake unit according to the invention will become clear from the following description of preferred embodiments thereof, given by way of non-limiting example, with reference to the appended drawings, in which.

DETAILED DESCRIPTION OF THE PREFERRED EMBODIMENTS

With reference to the drawings, a disk brake unit according to the present invention is generally indicated 1. In particular, in the embodiment described, reference will be made to a disk brake unit of the type with a fixed caliper for braking a conventional motor-vehicle wheel, not shown.

Figure 1:
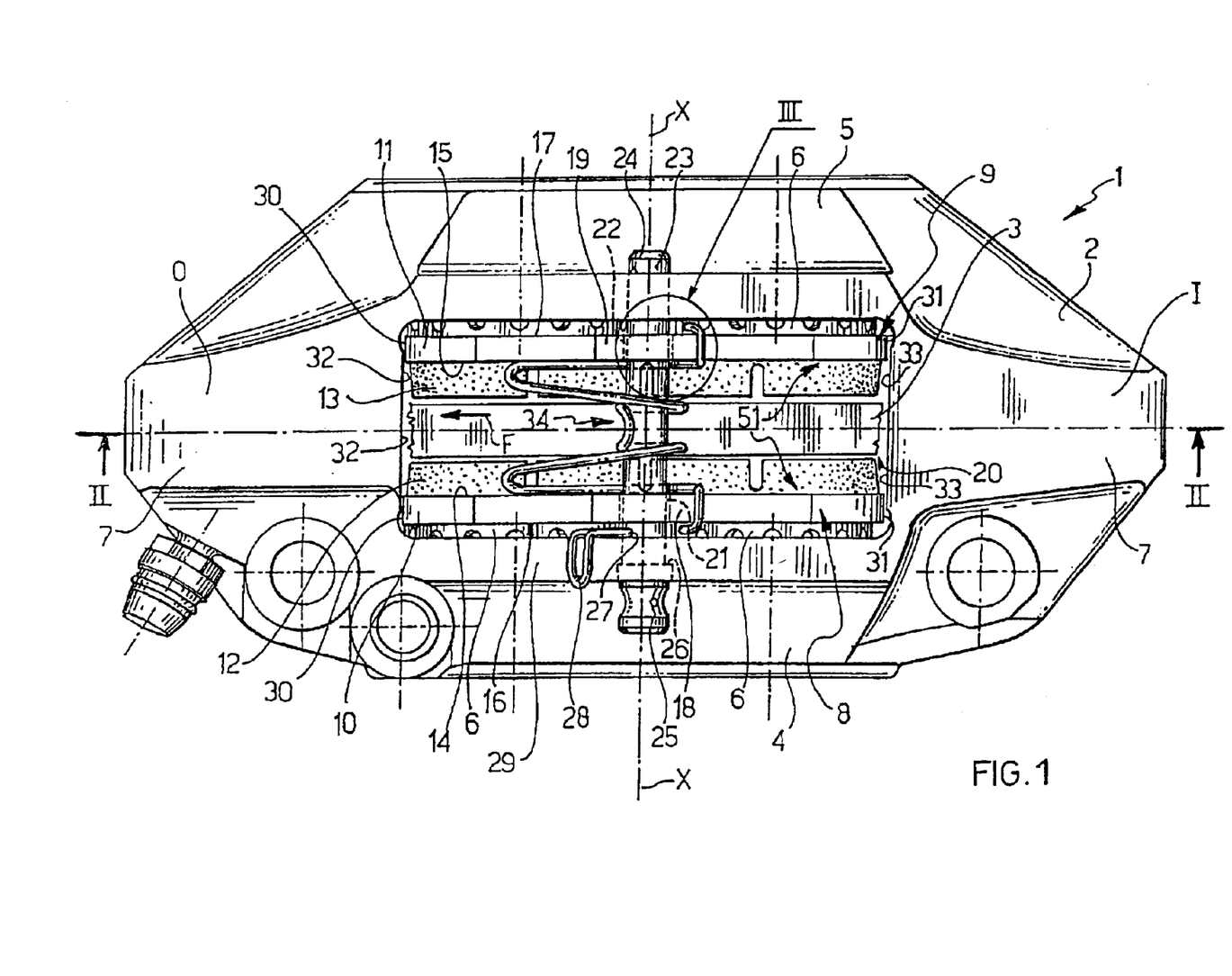
FIG. 1 is a view of a disk brake unit according to the invention, from above.
Figure 2:
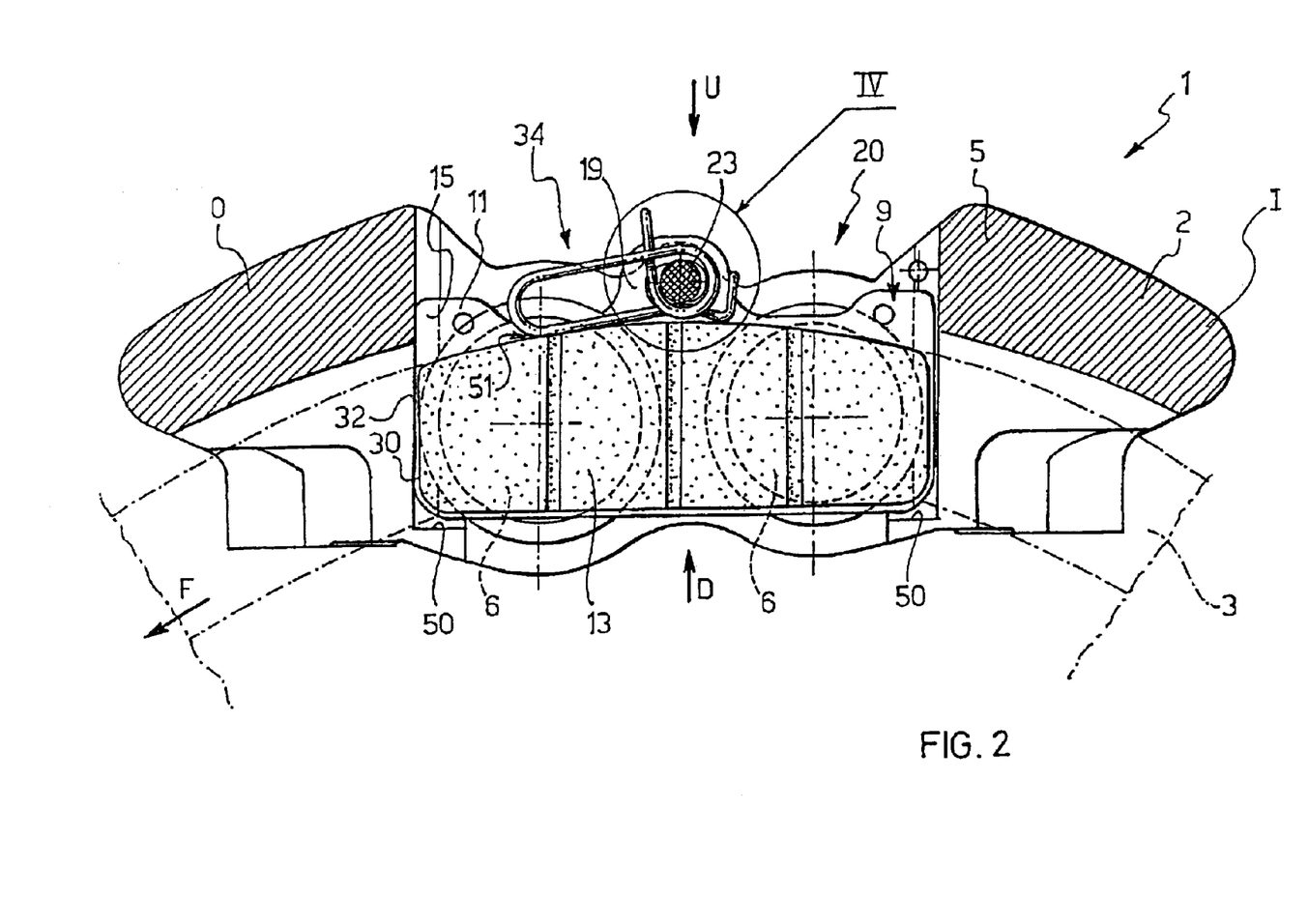
FIG. 2 is a section through the disk brake unit of FIG. 1, taken on the line II—II.
Figure 3:
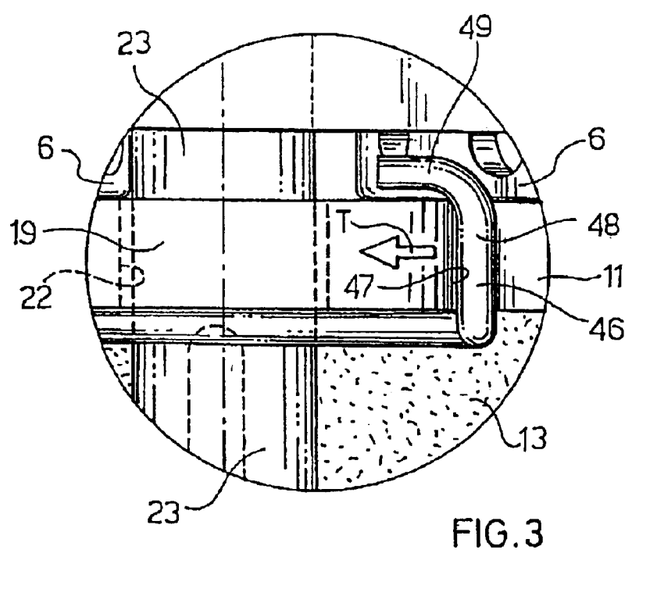
FIG. 3 shows the detail of the disk brake unit of FIG. 1 indicated by the arrow III, on an enlarged scale.

The disk brake unit 1 comprises a caliper body 2 connected to a conventional support which is intended to be fixed rigidly to a portion of the wheel suspension. The caliper body 2 extends astride a braking disk 3, of which the view shown schematically in FIGS. 1 and 2 is limited to a peripheral portion or braking band. The disk 3 is also fixed to the wheel in a conventional manner, not shown.

It should also be noted that, in normal conditions of forward movement of the motor vehicle, the braking band of the disk 3 moves through the disk brake unit 1, following an arcuate path, indicated by the arrow "F" (FIGS. 1 and 2). An upstream portion "I" and a downstream portion "O" are defined in the disk brake unit 1, with respect to this direction of movement. In the following description, any reference to "upstream" and "downstream" portions should be understood, as specified above, with reference to the above-mentioned direction of movement of the braking band through the brake unit 1. The direction identified by the above-mentioned arrow "F" is defined as a direction tangential to the disk. Reference will also be made below to portions or components of the brake unit which are disposed "above" or "outside the disk", meaning the portions or components which are disposed on the side of the unit indicated by the arrow "U" of FIG. 2. Similarly, reference will be made below to portions or components of the brake unit which are disposed "below" or "on the disk side", meaning the portions or components which are disposed on the side of the unit indicated by the arrow "D" of FIG. 2.

The caliper body 2 comprises, integrally, an outer caliper half-body 4 and an inner caliper half-body 5, positioned on opposite sides of the braking band of the disk 3. At least two single-acting pistons 6 are guided for sliding in hydraulic braking cylinders disposed facing one another and formed integrally within the half-bodies 4 and 5. Bridge portions 7 extending parallel to the axis X—X of rotation of the disk 3 interconnect the two half-bodies 4 and 5.

Figure 8:
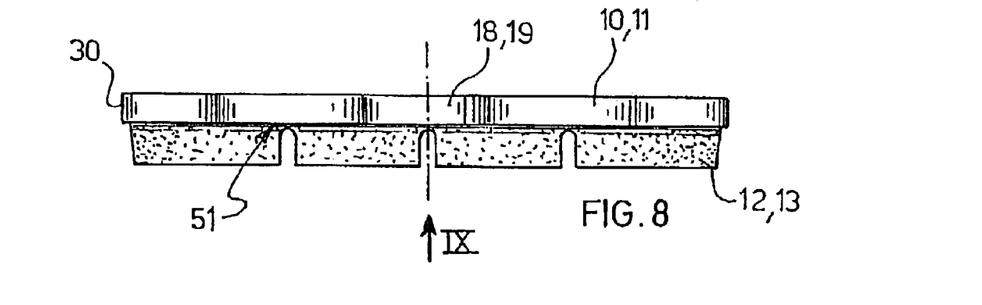
FIG. 8 is a view of a second component of the disk brake unit of FIG. 1, from above.
Figure 9:
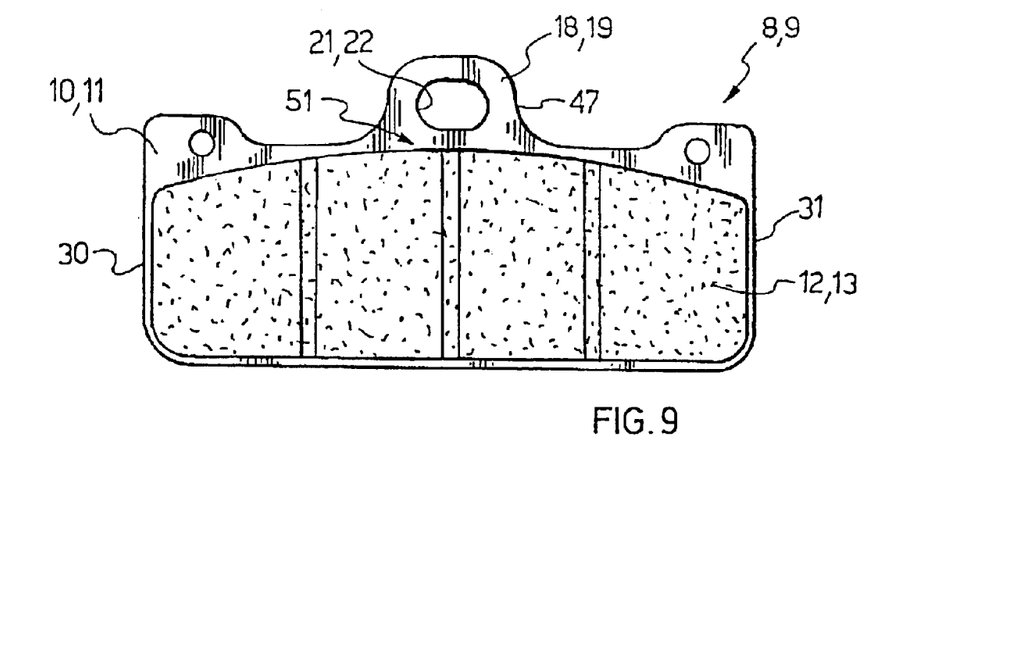
FIG. 9 shows the detail of FIG. 8, viewed along the arrow IX.

The disk brake unit 1 comprises at least one pair of identical and opposed pads 8 and 9 mounted on the caliper body 2 on opposite sides of the disk 3 and between the pistons 6. The pads 8, 9 comprise respective support plates 10 and 11 for supporting corresponding friction linings 12 and 13. In particular, the friction linings 12, 13 are fixed, in conventional manner, on respective faces or support surfaces 14 and 15 of the plates. The pads are mounted in the caliper body 2 with the corresponding friction linings 12 and 13 facing towards the disk 3 so that opposite faces or thrust surfaces 16 and 17 of the plates face towards the pistons 6. The plates have corresponding upper lug extensions or lugs 18 and 19 extending through a window 20 formed in an upper portion of the caliper body 2 between the half-bodies 4 and 5. The lugs have respective through-holes or slots 21 and 22. In each pad, the lug is advantageously provided in a substantially central position relative to the longitudinal dimension of the pad. In the working position, the slot in the lug is disposed above the disk or, in other words, outside the disk so that it is above the region in which the pistons act (FIGS. 2, 8 and 9).

Figure 10:
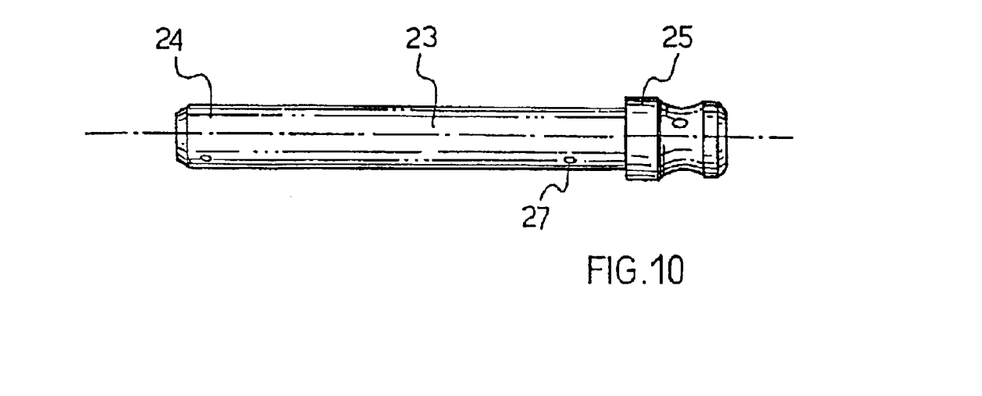
FIG. 10 is a view of a third component of the disk brake unit of FIG. 1, from above.
Figures 11, 13, 14:
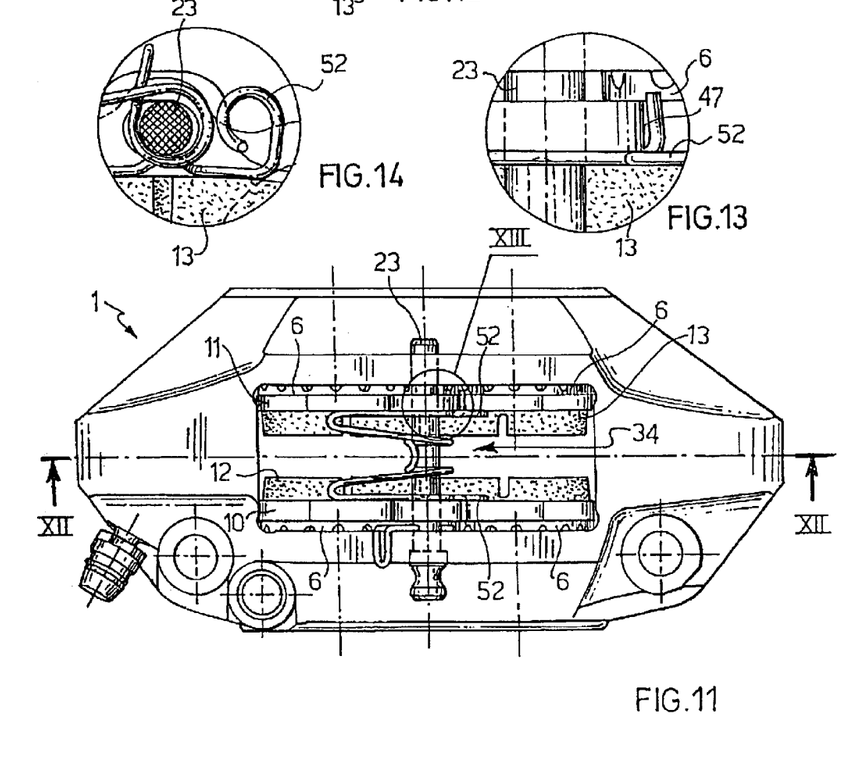
FIG. 11 is a view of a disk brake unit according to a second embodiment of the invention, from above.
FIG. 13 shows the detail of the disk brake unit of FIG. 11 indicated by the arrow XIII, on an enlarged scale.
FIG. 14 shows the detail of the brake unit of FIG. 12 indicated by the arrow XIV, on an enlarged scale.
Figure 12:
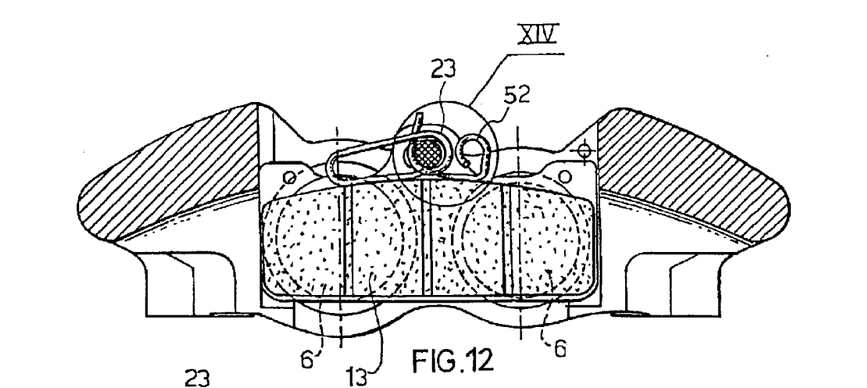
FIG. 12 is a section through the disk brake unit of FIG. 11, taken on the line XII—XII.
Figure 15:
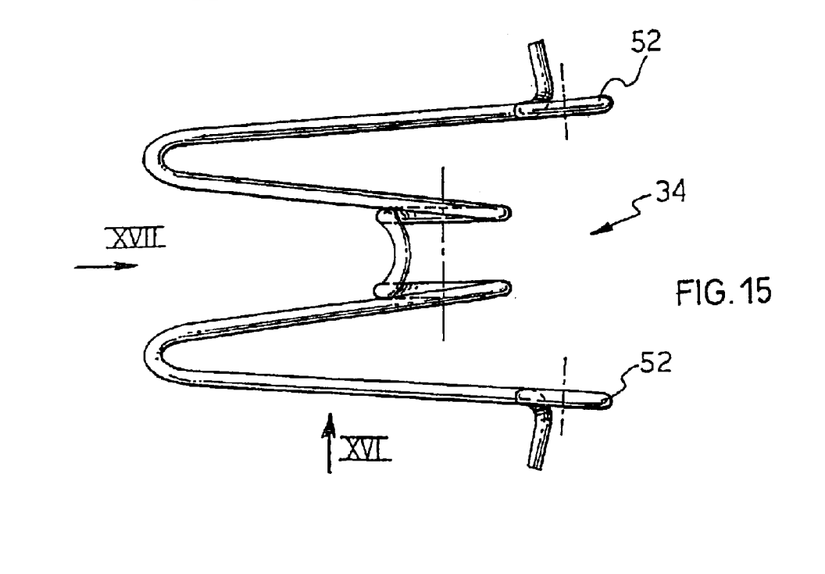
FIG. 15 is a view of a component of the disk brake unit of FIG. 11, from above.
Figure 16:
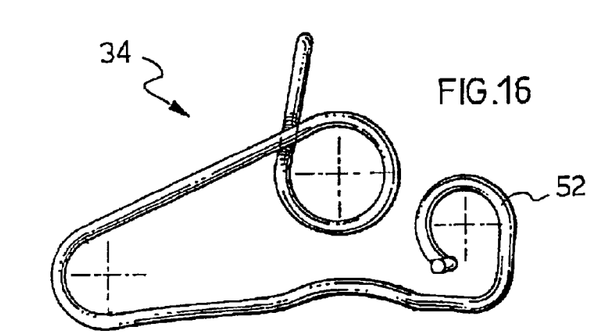
FIG. 16 shows the detail of FIG. 15, viewed along the arrow XVI.
Figure 17:
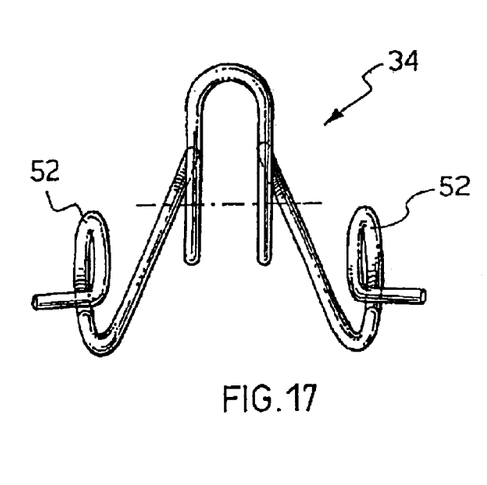
FIG. 17 shows the detail of FIG. 15, viewed along the arrow XVII.
Figures 18, 20, 21:
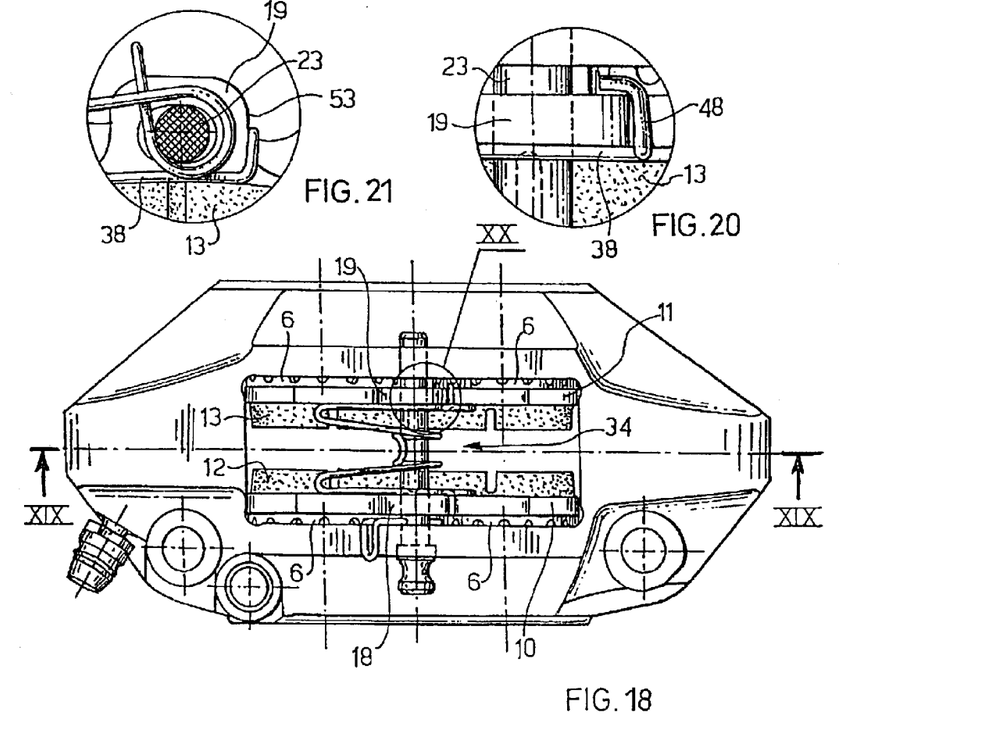
FIG. 18 is a view of a disk brake unit according to a third embodiment of the invention, from above.
FIG. 20 shows the detail of the brake unit of FIG. 18 indicated by the arrow XX, on an enlarged scale.
FIG. 21 shows the detail of the brake unit of FIG. 19 indicated by the arrow XXI, on an enlarged scale.
Figure 19:
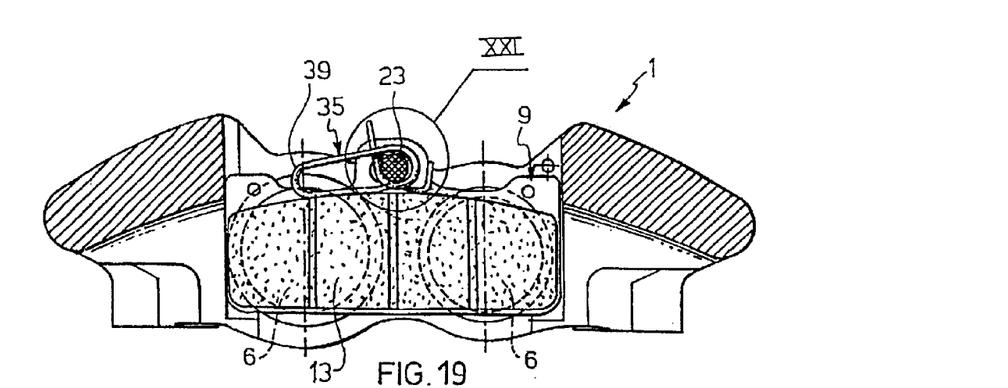
FIG. 19 is a section through the disk brake unit of FIG. 18, taken on the line XIX—XIX.

A pin 23 has a central portion of predominant length extending through the caliper body 2, through the window 20. The pin 23 is engaged through the slots 21 and 22 with clearance such that it secures the pads to the caliper body whilst allowing them to slide freely axially relative to the pin. In other words, the pin acts as a guide for the pads during the movement towards and away from the disk. The pin 23 has a tip end 24 and a head end 25 in guided engagement in the caliper body 2 on the sides on which the half-bodies 4 and 5 are disposed, respectively. The head end 25 is housed in abutment in a seat 26 formed in one half-body 4. A portion of the pin which is disposed far enough along the axis of the pin from the head end to project from the half-body 4 housing the head end 25, on the opposite side to the head end 25, has a seat for means for fixing the pin axially such as, for example, a transverse through-hole 27 in the pin for housing a split pin 28. The split pin 28 may have a portion projecting from the window 20 and bent against an upper surface 29 of the half-body 4 so as to prevent rotation of the pin 23 (FIGS. 1 and 10).

Each plate 10 (11) has, on opposite sides, lateral shoulders 30 and 31 constituting stop means for cooperating with facing first complementary stop means 32 formed in the downstream portion "O" of the caliper body 2 and second complementary stop means 33 formed in the upstream portion "I" of the caliper body 2. Both the first and the second complementary stop means are arranged tangentially relative to the disk. In the embodiment described, these first and second complementary stop means 32, 33 comprise opposed abutment surfaces defining laterally notches or grooves or, in other words, seats provided in the half-bodies 4 and 5 in positions facing the pistons 6.

The disk brake unit 1 also comprises a single element, generally indicated 34, disposed between the pin 23 and the at least one pair of pads in order to keep the pads constantly suspended on the pin and simultaneously to urge each pad constantly both towards the first complementary stop means 32 and away from the braking disk 3 (FIGS. 1, 2, 5, 6 and 7).

The single element advantageously comprises first portions 35 for urging the pads 8 and 9 away from the braking disk 3 and at the same time, for constantly maintaining the suspension on the pin 23. The term "maintaining the suspension" is intended to define an action which affects the pads 8, 9 and, in particular, the friction linings 12, 13, urging them away from the pin 23, towards the disk 3 so as to bring the pin 23 into abutment with the upper portion of the surface defining the slot 21 (22) formed in the lug 18 (19).

With further advantage, the single element 34 comprises second portions 36 for urging the pads 8, 9 towards the first complementary stop means 32. In other words, the single element 34 constantly urges the pads 8, 9 in the tangential direction "F" of the forward movement of the motor vehicle in a manner such that, upon braking, when the pads come into contact with the disk, the preloading provided by the single element prevents vibrations from arising, also facilitating the commencement of braking since the play between the plates and the pad seats in the caliper body is fully taken up by the single element, even before the braking action starts.

According to one embodiment, the single element 34 is a wire spring, for example, made of steel spring wire.

A configuration of the wire spring which ensures the desired simultaneous actions on the pads 8, 9 is a substantially "M"-shaped configuration which has two limbs constituting the first portions 35 and having first arms 37 and second arms 38 extending in different planes, as well as bent free ends constituting the second portions 36. The first and second arms are connected to one another by respective elbow portions 39.

Each second arm advantageously has a curved portion 42 shaped like a leaf spring. This portion bears against the pad with at least two end portions 43 and 44 of the second arm 38 and against the pin 23 with an intermediate portion 45. The leaf-spring-shaped curved portion 42 thus preloads the suspension of the pad on the pin, ensuring that, during the vibrational stresses which occur before and during braking, accidental stresses on the pad tending to lift or move the pad away from its working position facing the braking band of the disk are balanced by the constant action of the leaf-spring-shaped curved portion. In other words, this curved portion 42 can move the friction lining 12 (13) away from the pin 23 (arrow "P" of FIG. 4).

Figure 4:
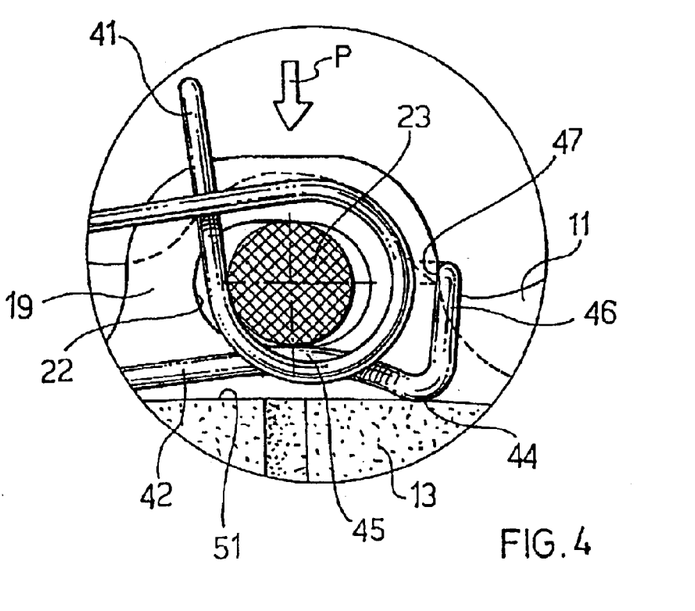
FIG. 4 shows the detail indicated by the arrow IV of the disk brake unit of FIG. 2, on an enlarged scale.
Figure 5:
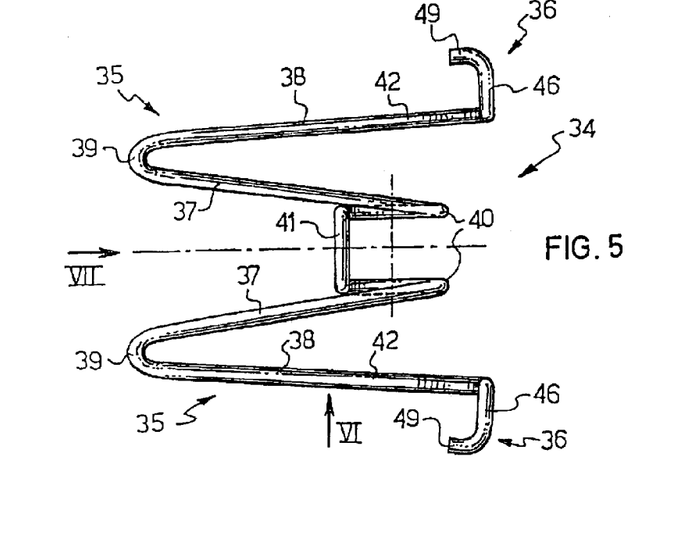
FIG. 5 is a view of a component of the disk brake unit of FIG. 1 from above.
Figure 6:
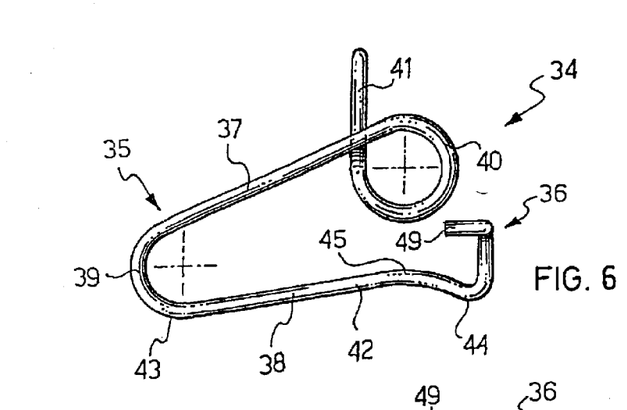
FIG. 6 shows the detail of FIG. 5, viewed along the arrow VI.
Figure 7:
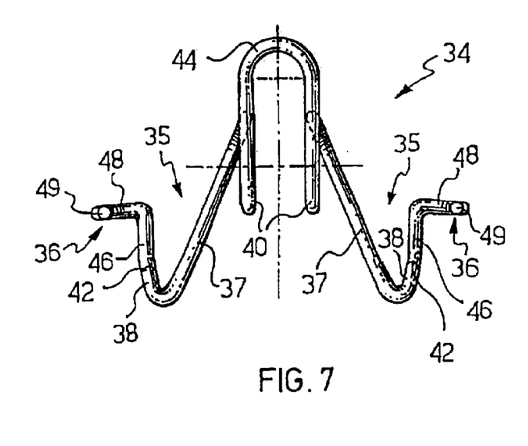
FIG. 7 shows the detail of FIG. 5, viewed along the arrow VII.

The spring 34 also comprises hook-shaped bent end portions 46 for urging the pads 8, 9 (in the direction of the arrow "T") towards the complementary stop means 32, in a direction tangential to the disk. The hook-shaped portions 46 are advantageously arranged astride the upper edge of the plate 10 (11), so as to abut the outer surface defining the lug-like extension 18 (19) and, in particular, to abut portions 47 of the lug which extend substantially radially relative to the disk 3. The hook-shaped portions 46 preferably have parts 48 which are disposed substantially transversely relative to the plates and which can engage the edge 47 the plate. With further advantage, the free end 49 of the hook 46 is bent onto the plate 10 (11) externally or, in other words, against the face 17 of the plate remote from the disk and facing the pistons 6 (FIGS. 4 and 5).

To ensure the correct arrangement of the wire spring 34 between the pin 23 and the pads 8, 9, the spring comprises a coiled portion 40 which is fitted on the pin 23. A portion constituting a mounting lever 41 extends from the top of the coil.

For a better understanding of the invention and appreciation of its advantages, the main steps of the assembly of the disk brake unit 1 are described below.

First of all, the pair of pads 8, 9 is inserted through the window 20 in the caliper body 2 so that each pad is housed in the respective seat defined laterally by the complementary stop means 32 and 33. This operation is facilitated by the provision of a temporary support surface 50 which is disposed in the half-bodies 4, 5 below the pistons 6 and which does not have the function of reacting to the braking forces but has the sole purpose of keeping the pads in the correct position during the assembly operations.

The wire spring 34 is then brought alongside the pads, passing through the window 20. During the insertion of the spring through the window 20 and between the pads, it will be necessary to move the limbs 35 towards each other so that the distance between them is less than the distance between the plates 10, 11 of the pads. When the limbs 35 of the spring are released, portions of the second arms 38 abut the pads. In particular, the second arms abut a connecting region 51 between the support plates 10, 11 and the friction linings 12, 13 of the pads.

During the insertion of the wire spring through the window until it abuts the pads, it is necessary to pay particular attention to its orientation relative to the caliper body and to the direction of forward movement of the vehicle. In particular, the wire spring must be oriented in a manner such that its hook-shaped ends 46 face the upstream portion "I" of the caliper body.

The pin 23 is then inserted. In order to insert the pin, it is necessary first of all to press the spring 34 towards the pads and at the same time towards the downstream portion "O" of the caliper body, by means of the mounting lever 41, until the eye defined by the coil-shaped portion 40 of the spring is aligned with the slots 21, 22 in the plates and the seats provided for the pin in the half-bodies 4, 5. During the insertion of the pin, the pads are lifted from the temporary support surfaces 50, remaining suspended on the pin 23. When the operation to insert the pin has been completed by the abutment of the head end 25 in the seat 26 of the half-body 4, accidental release of the pin is prevented by the insertion of the split pin 28 in the hole 27 in the pin which is accessible between the half-body 4 and the plate 10 (FIG. 1).

During the insertion of the pin 23, it will be necessary to force the intermediate portions 45 of the leaf-spring-shaped curved portions 42, preloading the suspension of the pads on the pin.

As a result of the provision of the limbs 35 of the wire spring 34 in abutment with the angles formed between the plates and the friction linings, a force having a component parallel to the plane of the braking band of the disk in a radial direction and directed towards the axis of the disk, as well as a component perpendicular to that plane and directed towards the pistons housed in the caliper body can be exerted on each pad. The radial component developed by the limbs of the spring keeps the upper, inner surface of the slot in the plate constantly in abutment with the pin, thus ensuring precise radial positioning of the friction linings, that is, it ensures that they face the disk perfectly in any working condition and in spite of the inevitable constructional play. The component directed towards the pistons keeps the pads constantly away from the disk and in abutment with the respective pistons when the brake unit is inactive. The fact that, by virtue of this transverse action of the spring relative to the disk, the pads are kept apart and in abutment with the pistons even when the caliper is not astride the disk, is also particularly advantageous. In other words, the spring acts as a separator so as always to permit mounting and removal of the disk or of the caliper body in the manner which will be described in greater detail below.

At the same time, the hook-shaped portions of the wire spring exert a force having a component directed towards the downstream portion of the caliper body, substantially in the same direction as the braking force and tangential to the disk. The force exerted by the hooks thus keeps the pads constantly in abutment with the complementary stop and braking-force reaction means formed in the downstream portion "O" of the caliper body, thus avoiding dead times-necessary for taking up the play between the pad and the caliper body, ensuring quicker braking of the vehicle every time the brake is operated. This arrangement also avoids impacts between the plates and the caliper body, as well as vibrations and annoying whistles.

As can be appreciated from the foregoing description, in addition to satisfying the above-mentioned requirements, the disk brake unit according to the present invention requires no tools for its assembly and the small assembly force required renders it also usable in racing equipment in which operation and maintenance times must be particularly short.

A further advantage of the invention lies in its unusual structural simplicity which enables it to be produced at a very low cost.

The fact that the wire spring enables the pads to be kept, unstressed by the pistons, outside the space occupied by the disk, even when the disk is removed, is a particular advantage. For a better appreciation of this advantage, the principal operations necessary to replace a racing vehicle wheel provided with a disk brake disk are described below.

First of all the wheel pin, and then the wheel complete with disk or disks, are removed. During this step, the calipers, which are supported by forks, are positioned towards the outside of the motor-vehicle by virtue of the ability of the forks to pivot freely about their own axes so as to permit removal of the bulky wheel-rim.

The new wheel provided with the disk or disks is then inserted until the caliper bodies are disposed in the space between the disks and the wheel rim. The caliper bodies are pivoted into alignment with the disks and the fitting of the wheel is completed. During this step, the braking bands of the disks reach their operative positions inside the caliper body only if the pads, which are floating on their pin, do not obstruct their insertion between the half-bodies. This is provided for safely by the above-described spring which constantly ensures that the pads are disposed in abutment with the pistons and that the necessary space between the half-bodies is free to receive the new disk.

Naturally, variations and/or additions may be provided for the embodiment described and illustrated above.

As an alternative to the arrangement shown in FIGS. 1 to 7, the hook of the single element 34 has a coiled portion 52. By virtue of the coiled portion, the wire spring exerts a constant force, even in the event of large movements of the pad (FIGS. 11 to 17).

As an alternative to the arrangement shown in FIGS. 1 to 9, a large part of the length of the second arm 38 of each limb 35 of the spring 34 abuts the pad and the constant suspension force on the pin 23 is ensured by the resilience of the elbow-like bent limb. In this case, the hook-shaped bent portion 36 and, in particular, the portion 48 disposed transversely relative to the plate 10 (11) will be free to slide on the side 53 of the lug 18 (19). For this reason, the plates 10, 11 will have lug-like extensions 18, 19 provided with sides 53 disposed radially and extending almost as far as the vicinity of the friction linings 12, 13 (FIGS. 18 to 25).

Figure 22:
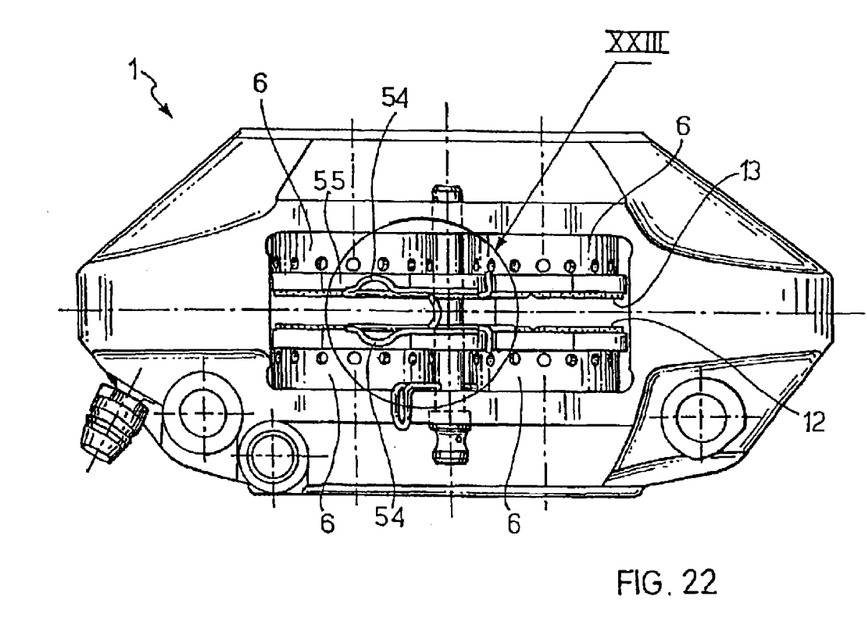
FIG. 22 is a view of the brake unit of FIG. 18 from above, in a further stage of operation.
Figure 23:
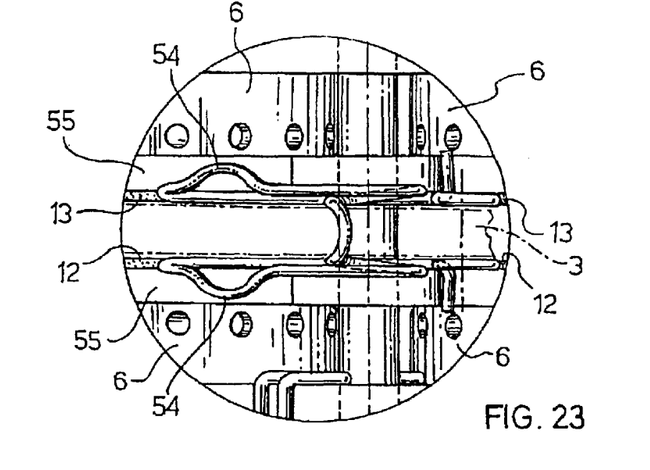
FIG. 23 shows the detail of the brake unit of FIG. 11 indicated by the arrow XXIII, on an enlarged scale.
Figure 24:
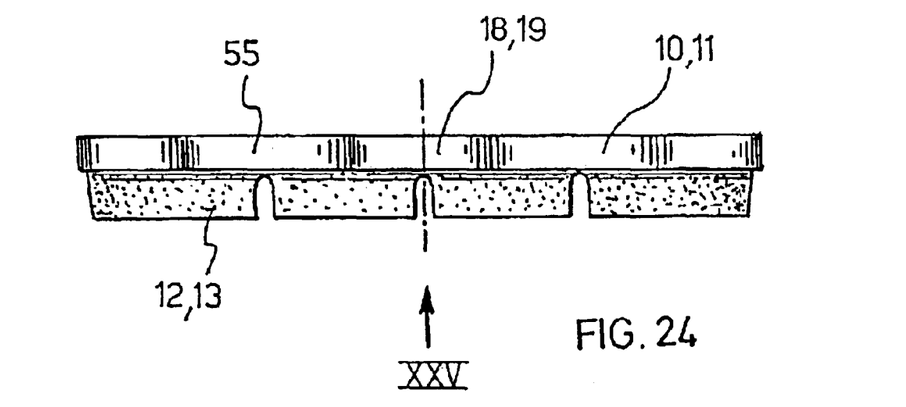
FIG. 24 shows a component of the disk brake unit of FIGS. 18 and 22, from above.
Figure 25:
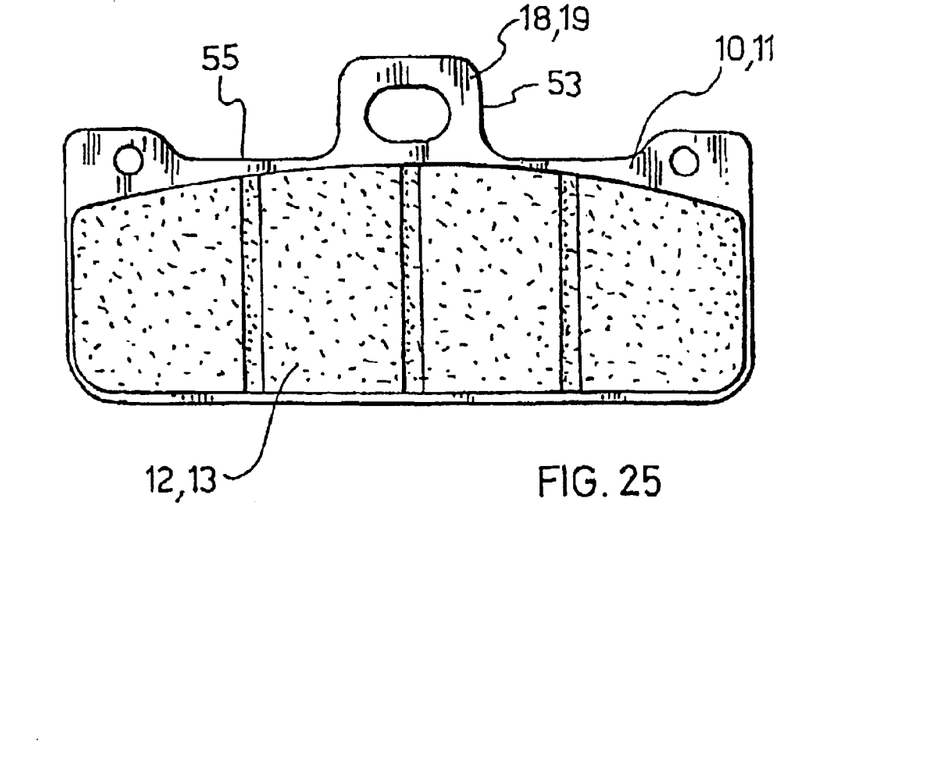
FIG. 25 shows the detail of FIG. 24 viewed along the arrow XXV.

To prevent the second arms from falling between the respective pads 8, 9 and the braking band of the disk 3 as a result of wear of the friction lining 12, 13, a portion 54 of each second arm is in abutment with an upper edge 55 of the respective plate 10, 11. For example, the second arm has a lateral extension which extends outwardly relative to the disk and which abuts the edge of the plate, urging it constantly into suspension on the pin, even if the friction linings are completely worn out (FIGS. 22 and 23).

As an alternative to the arrangement described above, the caliper may be of the floating type and may be intended for vehicles such as, for example, motorcars, snowmobiles, motor-vehicles, motorcycles, and the like.

A further subject of the present invention is a spare parts kit comprising at least a pair of pads, a pin and a single element for constantly maintaining the suspension of the pads on the pin and for constantly urging each pad both towards complementary stop means and away from the braking disk, as described above.

A further subject of the invention is the single element which can constantly maintain the suspension of the pads on a pin and which can constantly urge each pad both towards complementary stop means and away from the braking disk, as described above.

In order to satisfy contingent and specific requirements, an expert in the art may apply to the above-described preferred embodiments of the disk-brake unit many modifications, adaptations and replacements of elements with other functionally equivalent elements without, however, departing from the scope of the appended claims.

What is claimed is:

1. A disk-brake unit comprising:
   a caliper body extending astride a braking disk and including complementary stop means formed in the caliper body for restraining at least one pair of brake pads;
   a pin for positioning each of said brake pads relative to said caliper body; and
   a substantially "M"-shaped single element between the pin and said brake pads for positioning said brake pads relative to said pin, said single element comprising a pair of limbs, wherein each limb in said pair of limbs has a first arm and a second arm extending in different planes, and a substantially hook shaped bent end,
   wherein said single element maintains a suspension of each said brake pad away from said pin, urges each said brake pad toward said complementary stop means in a direction substantially tangential to said braking disk, and urges each said brake pad away from said braking disk in a direction substantially perpendicular to a radius of said braking disk, and
   wherein said second arm comprises a curved portion shaped like a leaf spring that preloads the suspension of each said brake pad in said pair of brake pads on said pin so as to move a friction lining of said brake pad away from said pin.

2. The disk-brake unit according to claim 1, wherein each of said brake pads comprises:
   a support plate;
   a friction lining attached to said support plate;
   a lug extension which is provided in a substantially central position of said pad,
   wherein said lug extension has a through hole that said pin is placed through.

3. The disk-brake unit according claim 2, wherein said through hole is a slot housing with a clearance for said pin.

4. The disk-brake unit according to claim 1, wherein said single element comprises first portions which urge the pads away from the braking disk and constantly maintain the suspension on the pin, and second portions which urge the pads towards said complementary stop means.

5. The disk-brake unit according to claim 1, wherein said single element is a wire spring.

6. The disk-brake unit according to claim 1, wherein said single element is composed of steel.

7. A substantially "M"-shaped single element suitable for use in a disk-brake unit having a caliper body with a complementary stop means, a pair of brake pads, a braking disk, and a pin, said single element comprising:
   a pair of limbs, wherein each limb in said pair of limbs has a first arm and a second arm extending in different planes, and a substantially hook shaped bent end,
   wherein said single element maintains a suspension of each said brake pad away from said pin, urges each said brake pad toward said complementary stop means in a direction substantially tangential to said braking disk, and urges each said brake pad away from said braking disk in a direction substantially perpendicular to a radius of said braking disk, and
   wherein said second arm comprises a curved portion shaped like a leaf spring that preloads the suspension of each said brake pad in said pair of brake pads on said pin so as to move a friction lining of said brake pad away from said pin.

8. The single element according to claim 7, further comprising a coiled portion.

9. The single element according to claim 8, further comprising a mounting lever extending from said coiled portion.

10. The single element according to claim 7, wherein said second arm has portions abutting each said brake pad in said pair of brake pads.

11. The single element according to claim 7, wherein said second arm abuts connecting regions between a support plate and a friction lining of said brake pad in said pair of brake pads.

12. The single element according to claim 7, wherein said second arm abuts an upper edge of a plate of each said brake pad in said pair of brake pads.

13. The single element according to claim 7, wherein said hook shaped bent end is disposed astride a plate of each said brake pad in said pair of brake pads.

14. The single element according to claim 7, wherein said hook shaped bent end has parts disposed substantially transversely relative a plate of each said brake pad in said pair of brake pads.

15. The single element according to claim 7, wherein the end of said hook shaped bent end is bent onto a plate of each said brake pad in said pair of brake pads externally.

16. The single element according to claim 7, wherein said single element is a wire spring.

17. The single element according to claim 7, wherein said hook shaped bent end has a coiled portion.

18. The single element according to claim 7, wherein said single element is composed of steel.

19. A disk-brake unit comprising:
a caliper body extending astride a braking disk and including complementary stop means formed in the caliper body for restraining at least one pair of brake pads;
a pin for positioning each of said brake pads relative to said caliper body; and
a substantially "M"-shaped single element between the pin and said brake pads for positioning said brake pads relative to said pin, said single element comprising a pair of limbs, wherein each limb in said pair of limbs has a first arm and a second arm extending in different planes, and a substantially hook shaped bent end,
wherein said single element maintains a suspension of each said brake pad away from said pin, urges each said brake pad toward said complementary stop means in a direction substantially tangential to said braking disk, and urges each said brake pad away from said braking disk in a direction substantially perpendicular to a radius of said braking disk, and
wherein said hook shaped bent end urges each said brake pad in said pair of brake pads towards a complementary stop means formed in said caliper body in a direction substantially tangential to said braking disk.

20. The disk-brake unit according to claim 19, wherein each of said brake pads comprises:
a support plate;
a friction lining attached to said support plate;
a lug extension which is provided in a substantially central position of said pad,
wherein said lug extension has a through hole that said pin is placed through.

21. The disk-brake unit according to claim 20, wherein said through hole is a slot housing with a clearance for said pin.

22. The disk-brake unit according to claim 19, wherein said single element comprises first portions which urge the pads away from the braking disk and constantly maintain the suspension on the pin, and second portions which urge the pads towards said complementary stop means.

23. The disk-brake unit according to claim 19, wherein said single element is a wire spring.

24. The disk-brake unit according to claim 19, wherein said single element is composed of steel.

25. A substantially "M"-shaped single element suitable for use in a disk-brake unit having a caliper body with a complementary stop means, a pair of brake pads, a braking disk, and a pin, said single element comprising:
a pair of limbs, wherein each limb in said pair of limbs has a first arm and a second arm extending in different planes, and a substantially hook shaped bent end,
wherein said single element maintains a suspension of each said brake pad away from said pin, urges each said brake pad toward said complementary stop means in a direction substantially tangential to said braking disk, and urges each said brake pad away from said braking disk in a direction substantially perpendicular to a radius of said braking disk, and
wherein said hook shaped bent end urges each said brake pad in said pair of brake pads towards a complementary stop means formed in said caliper body in a direction substantially tangential to said braking disk.

26. The single element according to claim 25, further comprising a coiled portion.

27. The single element according to claim 26, further comprising a mounting lever extending from said coiled portion.

28. The single element according to claim 25, wherein said second arm has portions abutting each said brake pad in said pair of brake pads.

29. The single element according to claim 25, wherein said second arm abuts connecting regions between a support plate and a friction lining of said brake pad in said pair of brake pads.

30. The single element according to claim 25, wherein said second arm abuts an upper edge of a plate of each said brake pad in said pair of brake pads.

31. The single element according to claim 25, wherein said hook shaped bent end is disposed astride a plate of each said brake pad in said pair of brake pads.

32. The single element according to claim 25, wherein said hook shaped bent end has parts disposed substantially transversely relative a plate of each said brake pad in said pair of brake pads.

33. The single element according to claim 25, wherein the end of said hook shaped bent end is bent onto a plate of each said brake pad in said pair of brake pads externally.

34. The single element according to claim 25, wherein said single element is a wire spring.

35. The single element according to claim 25, wherein said hook shaped bent end has a coiled portion.

36. The single element according to claim 25, wherein said single element is composed of steel.

37. A disk-brake unit comprising:
a caliper body extending astride a braking disk and including a temporary support surface and complementary stop means, for restraining at least one pair of brake pads, formed in the caliper body;
a pin for positioning each of said brake pads relative to said caliper body; and
a single element between the pin and said brake pads for positioning said brake pads relative to said pin,
wherein said single element maintains a suspension of each said brake pad away from said pin, urges each said brake pad toward said complementary stop means in a direction substantially tangential to said braking disk, and urges each said brake pad away from said braking disk in a direction substantially perpendicular to a radius of said braking disk, and
wherein said single element applies a suspending force only on each said brake pad and said pin so as to move each said brake pad away from said pin while maintaining a gap between a bottom of each said brake pad and said temporary support surface of said caliper body.

38. The disk-brake unit according to claim 37, wherein each of said brake pads comprises:

a support plate;

a friction lining attached to said support plate;

a lug extension which is provided in a substantially central position of said pad, wherein said lug extension has a through hole that said pin is placed through.

39. The disk-brake unit according to claim 38, wherein said through hole is a slot housing with a clearance for said pin.

40. The disk-brake unit according to claim 37, wherein said single element comprises first portions which urge the pads away from the braking disk and constantly maintain the suspension on the pin, and second portions which urge the pads towards said complementary stop means.

41. The disk-brake unit according to claim 37, wherein said single element is a wire spring.

42. The disk-brake unit according to claim 37, wherein said single element is composed of steel.

* * * * *